United States Patent [19]
Loce et al.

[11] Patent Number: 5,696,845
[45] Date of Patent: Dec. 9, 1997

[54] METHOD FOR DESIGN AND IMPLEMENTATION OF AN IMAGE RESOLUTION ENHANCEMENT SYSTEM THAT EMPLOYS STATISTICALLY GENERATED LOOK-UP TABLES

[75] Inventors: Robert P. Loce; Michael S. Cianciosi, both of Rochester, N.Y.

[73] Assignee: Xerox Corporation, Stamford, Conn.

[21] Appl. No.: 169,485

[22] Filed: Dec. 17, 1993

[51] Int. Cl.⁶ .............................. G06K 9/40; G06F 15/00
[52] U.S. Cl. ........................ 382/254; 395/102; 395/109
[58] Field of Search ................................ 358/296, 298; 382/209, 232, 254; 395/102, 101, 104, 108, 109

[56] References Cited

U.S. PATENT DOCUMENTS

| | | | |
|---|---|---|---|
| 4,437,122 | 3/1984 | Walsher et al. | 358/166 |
| 4,460,909 | 7/1984 | Bassetti | 346/160 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,814,890 | 3/1989 | Kato | 358/280 |
| 4,841,375 | 6/1989 | Nakajima et al. | 353/280 |
| 4,847,641 | 7/1989 | Tung | 346/154 |
| 4,933,689 | 6/1990 | Yoknis | 346/154 |
| 5,005,139 | 4/1991 | Tung | 364/519 |
| 5,029,108 | 7/1991 | Lung | 364/519 |
| 5,134,495 | 7/1992 | Frazier et al. | 358/298 |
| 5,138,339 | 8/1992 | Curry et al. | 346/108 |
| 5,142,374 | 8/1992 | Tajika et al. | 358/298 |
| 5,150,311 | 9/1992 | Long et al. | 395/108 |
| 5,161,035 | 11/1992 | Muramatsu | 358/451 |
| 5,193,008 | 3/1993 | Frazier et al. | 358/298 |
| 5,206,741 | 4/1993 | Shimura et al. | 358/404 |
| 5,237,646 | 8/1993 | Bunce | 382/254 |
| 5,255,351 | 10/1993 | Takanashi et al. | 395/109 |
| 5,329,599 | 7/1994 | Curry et al. | 382/266 |
| 5,404,411 | 4/1995 | Banton et al. | 382/254 |
| 5,479,584 | 12/1995 | Curry | 395/102 |
| 5,486,927 | 1/1996 | Koizumi et al. | 358/298 |
| 5,502,793 | 3/1996 | Ng | 395/109 |
| 5,516,216 | 5/1996 | McDonough et al. | 395/108 |

FOREIGN PATENT DOCUMENTS 0177640  4/1986  European Pat. Off. ........ G06F 15/16

OTHER PUBLICATIONS

James C. Stoffel et al. *A Survey of Electronic Techniques for Pictorial Image Reproduction,* IEEE Transactions on Communications, vol. Com–29, No. 12, Dec. 1981.

L. Steidel *Technology Overview: Resolution Enhancement Technologies for Laser Printers,* LaserMaster Corp., Sep. 1991.

Robert P. Loce et al. *Facilitation of Optimal Binary Morphological Filter Design via Structuring Element Libraries and Design Constraints,* Optical Engineering, vol. 31, No. 5, May 1992, pp. 1008–1025.

Edward R. Dougherty ed. Marcel Dekker 1992, *Mathematical Morphology in Image Processing,* pp. 43–90.

Robert P. Loce et al., *Optimal Morphological Restortation: The Morphological Filter Mean–Absolute–Error Theorem,* (Academic Press), vol. 3, No. 4, Dec. 1992, pp. 412–432.

(List continued on next page.)

*Primary Examiner*—Leo Boudreau
*Assistant Examiner*—Bhavesh Mehta
*Attorney, Agent, or Firm*—Duane C. Basch

[57] ABSTRACT

The present invention is a method and apparatus for improving the appearance of printed documents, and more specifically, to the use of a template matching process to enhance the fast-scan resolution of digital images while maintaining raster resolution for printing. The present invention uses multiple-bit per pixel, statistically generated templates, implemented using look-up tables, to improve document appearance by converting from a single-bit per pixel to N-bits per pixel, while preserving raster resolution of the printed output. The resulting N-bit per pixel image signals may be utilized to control a scanning beam where the beam varies in intensity and duration according to the pulses used to control it.

17 Claims, 11 Drawing Sheets

OTHER PUBLICATIONS

Edward R. Dougherty et al., *Optimal Mean–Absolute–Error Hit–or–Miss Filters: Morphological Representation and Estimation of the Binary Conditional Expectation*, Optical Engineering, vol. 32, No. 4, Apr. 1993, pp. 815–827.

Donald L. Ort *Character Edge Smoothing For Matrix Printing*, Xerox Disclosure Journal, vol. 6, No. 1, Jan./Feb. 1981, p. 19.

XDJ, vol. 5, No. 1, Jan./Feb. 1980, pp. 115–116.

Torrey Pines Research, *Behind Hewlett–Packard's Patent on Resolution Enhancement Technology*, (Becky Colgan ed., BIS CAP Int'l, 1990) pp. 1–60.

DP–Tek, Inc., *TrueRes Resolution Transformation Technology*, 6 pages, May 27, 1993.

Adam L. Carley, PhD., *Resolution Enhancement in Laser Printers*, XLI Corp. Woburn, Mass., 1993, pp. 1–16.

METHOD FOR DESIGN AND IMPLEMENTATION OF AN IMAGE RESOLUTION ENHANCEMENT SYSTEM THAT EMPLOYS STATISTICALLY GENERATED LOOK-UP TABLES

This invention relates generally to a method and apparatus for improving the appearance of printed documents, and more particularly to the use of a template matching process to enhance the fast-scan resolution of digital images while maintaining raster, or slow-scan, resolution for printing.

CROSS REFERENCE

The following related applications are hereby incorporated by reference for their teachings:

"Non-Integer Image Resolution Conversion Using Statistically Generated Look-Up Tables," Loce et al., Ser. No. 08/170,082 (U.S. Pat. No. 5,387,985), filed concurrently herewith;

"Method for Statistical Generation of Density Preserving Templates for Print Enhancement," Loce et al., Ser. No. 08/169,565 (U.S. Pat. No. 5,359,423), filed concurrently herewith;

"Image Resolution Conversion Method that Employs Statistically Generated Multiple Morphological Filters," Loce et al., Ser. No. 08/169,487, filed concurrently herewith; and "Automated Template Design for Print Enhancement," Eschbach, Ser. No. 08/169,483, filed concurrently herewith.

BACKGROUND AND SUMMARY OF THE INVENTION

Information systems for handling numerous document and data formats are moving towards becoming open systems where different devices are tied to one another to provide solutions to customers' needs. A key factor in such open systems is enabling an electronic document to be printed so that the customer does not perceive any difference between versions printed on different output devices. In order to achieve complete device-independence, efficient methods of accurately altering image resolution and enhancement are required to take advantage of the technology. Hence, raster conversion technology, where a bitmap created for a first output device is altered so as to be printable on a second output device, has become an important aspect of the open system technology.

The present invention uses multiple-bit per pixel, statistically generated look-up tables to improve document appearance by converting from a single-bit per pixel to N-bits per pixel while preserving raster resolution of the printed output. The resulting N-bit per pixel image signals may then be used to drive output devices with higher fast-scan resolution or, as will be described, output devices capable of printing multiple-bit per pixel output. The present invention may be utilized to control a scanning beam where the beam varies in intensity and duration according to the pulses used to control it. For example, a laser beam may be used in a printer for selectively exposing areas on a photoreceptor. The latent electrostatic image formed on the photoreceptor by the beam exposure attracts developing toner, in proportion to the latent image charge level, to develop the image. As another example, a cathode ray tube uses an electron beam to scan a phosphorous screen. The electron beam may be varied in intensity and duration to accurately display information on the phosphor screen. In both examples, a pulse forming circuit responsive to the multiple-bit per pixel image signal may be used to generate video pulses to control the intensity and operation time of the respective beams.

Previously, various methods and apparatus have been used to vary the position and width of pulses used to control laser or CRT beams, and to alter the resolution of bitmapped images. The following disclosures may be relevant:

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,544,922 to Watanabe et al. teaches a smoothing circuit for an orthogonal matrix display. The circuit adds or removes a "small dot" on the display from either the first or last third of a dot clock (DCK) period that is one-third the period in which a standard dot of the original pattern is displayed.

U.S. Pat. No. 4,814,890 to Kato describes an image communicating system for transmitting or receiving image data. In the system, the pixel density of the transmitting image data is converted in accordance with the recording density on the reception side to enable printing by a high-speed laser printer without a change in the image size.

U.S. Pat. No. 4,841,375 to Nakajima et al. discloses an image resolution conversion apparatus that converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/output (I/O) and the conversion operations.

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 4,933,689 to Yoknis describes a method for enhancing a displayed image in a laser exposed dot matrix format to produce softened edge contours. Using three pulses, a central pulse plus leading and trailing enhancement pulses that are separated therefrom. The purpose of the leading and trailing pulses is to create a blurred or grayed region at the leading and trailing edges of each associated character.

U.S. Pat. No. 5,134,495 to Frazier et al. discloses a laser based imaging system that employs a resolution transformation method. The method uses the selective activation in overlapping areas between rasters (scan lines). In one embodiment, a single interleaved pixel, between two scan lines, is formed by the sum of up to six laser pulses at pixel points on adjacent scan lines. In some cases the laser pulses are of insufficient intensity to produce a dot or mark at the point on the scan line where the center of the pulse is received.

U.S. Pat. No. 5,138,339 to Curry et al. teaches methods and means for increasing the precision with which optical printers that utilize high gamma recording media, such as xerographic printers, spatially position transitions in the images they print. The invention provides microaddressable display systems for rendering two-dimensional on photosensitive media. The microaddressability results from the overscanning of intensity modulated spots that superimpose multiple discrete exposures on the recording medium, wherein the separation of the of the exposure centers is significantly less than the spatial diameter of the spots.

U.S. Pat. No. 5,142,374 to Tajika et al. teaches an image recording apparatus for recording a gradient image by combining dots of different densities. The different density dots are produced by generating a pair of binary signals, one for light ink and one for dark ink, from image data received. The discharge of each ink from a bubble jet is controlled in accordance with the signals.

U.S. Pat. No. 5,150,311 to Long et al. discloses a system for producing print-dot data suitable for driving a hardcopy printing device. More specifically, the print-dot data is selectively obtained from a conversion operation carried out by a matrix and dot generator combination which respectively generate subtractive color components and a pattern of high resolution print-dots therefrom.

U.S. Pat. No. 5,193,008 to Frazier et al. further describes the resolution enhancement apparatus as one that includes the ability to rasterize the image to be printed at twice the resolution of the printer. The printer then outputs the higher resolution image using an interleaving technique that generates developable dots between scan lines by energizing corresponding dots on adjacent scan lines at a level which will not be developed, but where the overlapping portion of the two corresponding dots will be developable.

U.S. Pat. No. 5,206,741 to Shimura et ah discloses an image processing apparatus for processing image data to be output by a printing unit. A conversion unit converts pixel image data within an image memory into data having a resolution equal to the output resolution of the print mechanism.

A number of the previously described patents and publications are summarized in Torrey Pines Research, *Behind Hewlett-Packard's Patent on Resolution Enhancement™ Technology*, (Becky Colgan ed., BIS CAP International, 1990) pp. 1–60, including concepts associated with resolution enhancement.

U.S. patent application Ser. No. 07/513,415, and the corresponding Japanese laid-open patent publication 4-227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

L. Steidel in *Technology Overview: Resolution Enhancement Technologies for Laser Printers*, LaserMaster Corp., discusses three currently available implementations for vertical resolution enhancement, Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser laser energy from a brief laser flash, which leaves only residual or fringe energy on the image drum at the periphery of a pixel of an adjacent pixel on a second scan line.

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter design. Although the resulting filter is suboptimal, imposition of the constraints in a suitable manner results in little loss of performance in return for design tractability.

*Mathematical Morphology in Image Processing*, pp. 43–90 (Edward R. Dougherty ed., Marcel Dekker 1992), hereby incorporated by reference, describes efficient design strategies for the optimal binary digital morphological filter. A suboptimal design methodology is investigated for binary filters in order to facilitate a computationally manageable design.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412–432, hereby incorporated by reference, teach expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit-or-miss filters: morphological representation and estimation of the binary conditional expectation*, Optical Engineering, Vol. 32, No. 4, April 1993, pp. 815–827, incorporated herein by reference, disclose the use of a hit-or-miss operator as a building block for optimal binary restoration filters. Filter design methodologies are given for general-, maximum-, and minimum-noise environments and for iterative filters.

In accordance with the present invention, there is provided a method for enhancing a printed output produced by an electronic reprographic system capable of printing a bitmap image by producing a series of pulse-width, position-modulated signals, comprising the steps of: selecting a target pixel location in the bitmap image; observing a set of pixels within a pixel observation window superimposed on the bitmap image, relative to the target pixel location; generating an index pointer as a function of a subset of the set of pixels; and using the index pointer, looking-up a code that defines the characteristics of the pulse-width, position modulated signal that will be used to print the target pixel so as to enhance the resulting printed output.

In accordance with another aspect of the present invention, there is provided an electronic printing apparatus capable of printing a bitmap image by producing a series of pulse-width, position-modulated signals, comprising: pixel selection means for selecting a target pixel location in the bitmap image; image memory for recording the binary states of a set of pixels in the bitmap image located within a pixel observation window positioned relative to the target pixel location; a pixel state register for storing an address generated as a function of the binary states of a subset of the pixels stored in said image memory; and translating means, responsive to the value stored in said pixel state register, for outputting a pulse attribute word that defines the characteristics of the pulse-width, position modulated signal used to print the target pixel so as to enhance the resulting printed output.

In accordance with yet another aspect of the present invention, there is provided an electronic printing machine, comprising: a raster exposure device; and an enhancement filter, connected to said raster exposure device, for performing 1-to-N bit per pixel resolution enhancement on a bitmap image input thereto so as to produce a series of pulse-width, position-modulated signals to drive said raster exposure device.

Figure 1:
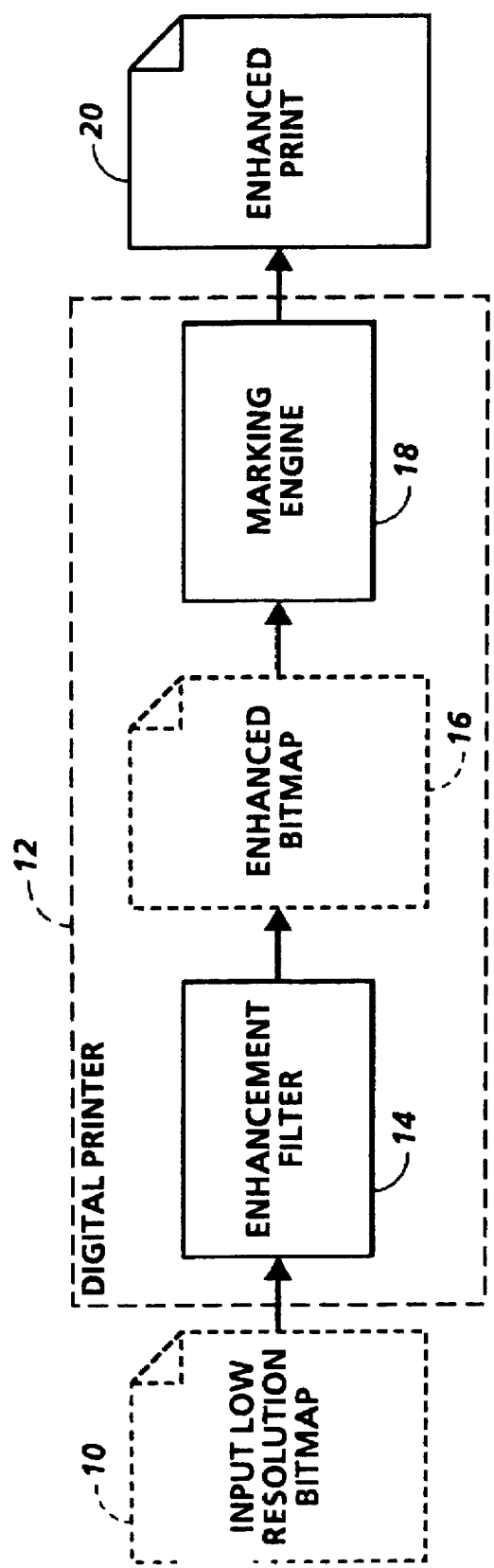
FIG. 1 is a block diagram of a digital printer embodiment employing the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. The terms image signal, video data, and pixel are interchangeably used herein to describe discrete digital signals that represent the active (on) or inactive (off) state of an element within a digital image. In addition, shaded or cross-hatched portions of image bitmaps depicted herein are intended to represent black or active pixels (having a value of 1 in a binary representation) within the bitmaps. Such a representation is not intended to limit the present invention, but to simplify the description thereof. Accordingly, the present invention may be operated in the same manner by substituting white pixel states wherever black pixels are indicated, and vice versa.

FIG. 1 is a block diagram of a digital printer that illustrates a preferred embodiment of the present invention. As shown, a low resolution bitmap image 10 is presented to a digital printer 12 to produce printed output. Within the digital printer employing the present invention is enhancement filter 14 that transforms the input bitmap into an enhanced bitmap image 16. The enhanced bitmap image is then passed to marking engine 18 for exposure and development, as will be described with respect to FIG. 3, to produce enhanced output print 20.

Figure 2:
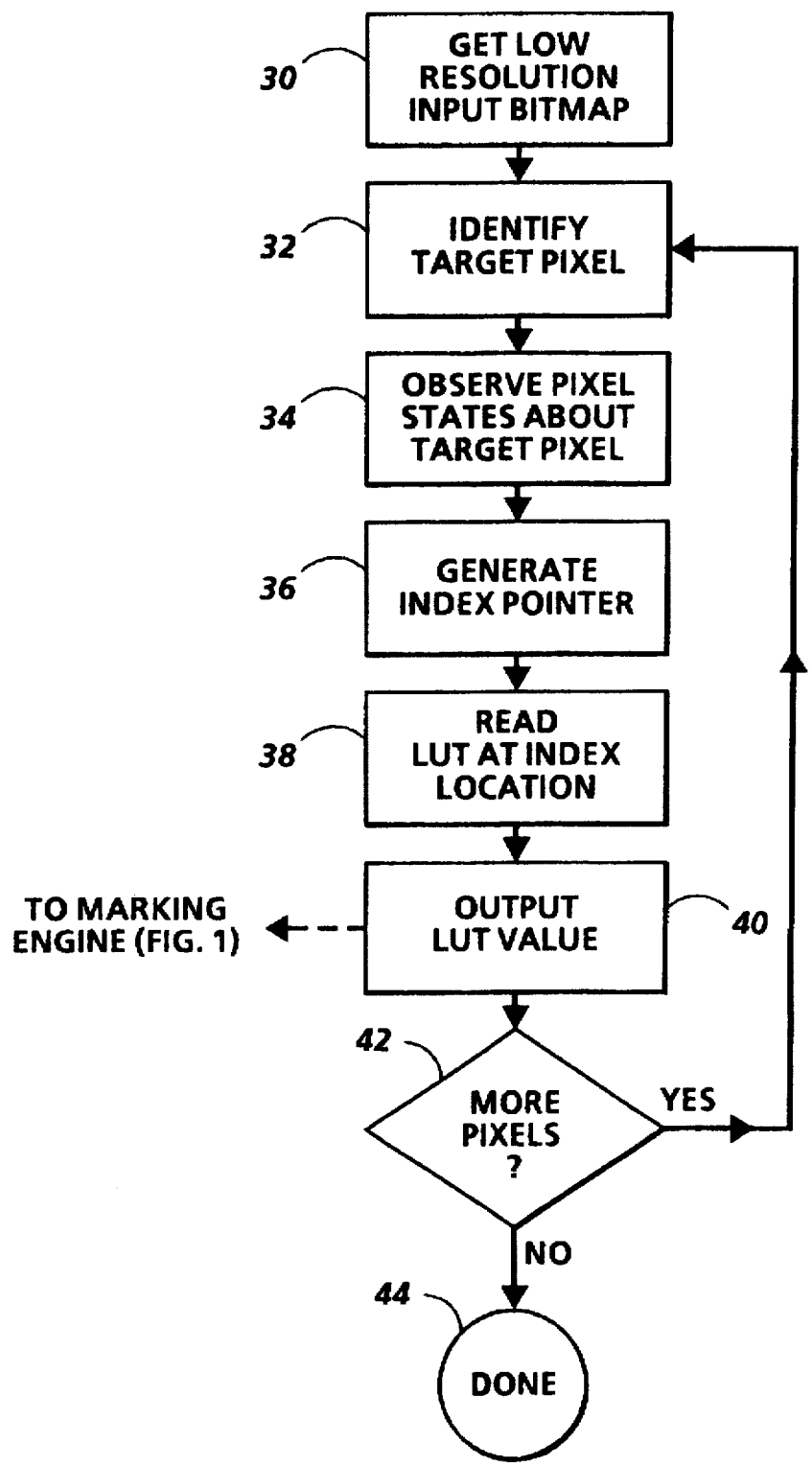
FIG. 2 is a flowchart illustrating the process steps necessary to accomplish image resolution enhancement in accordance with the present invention.
Figure 3:
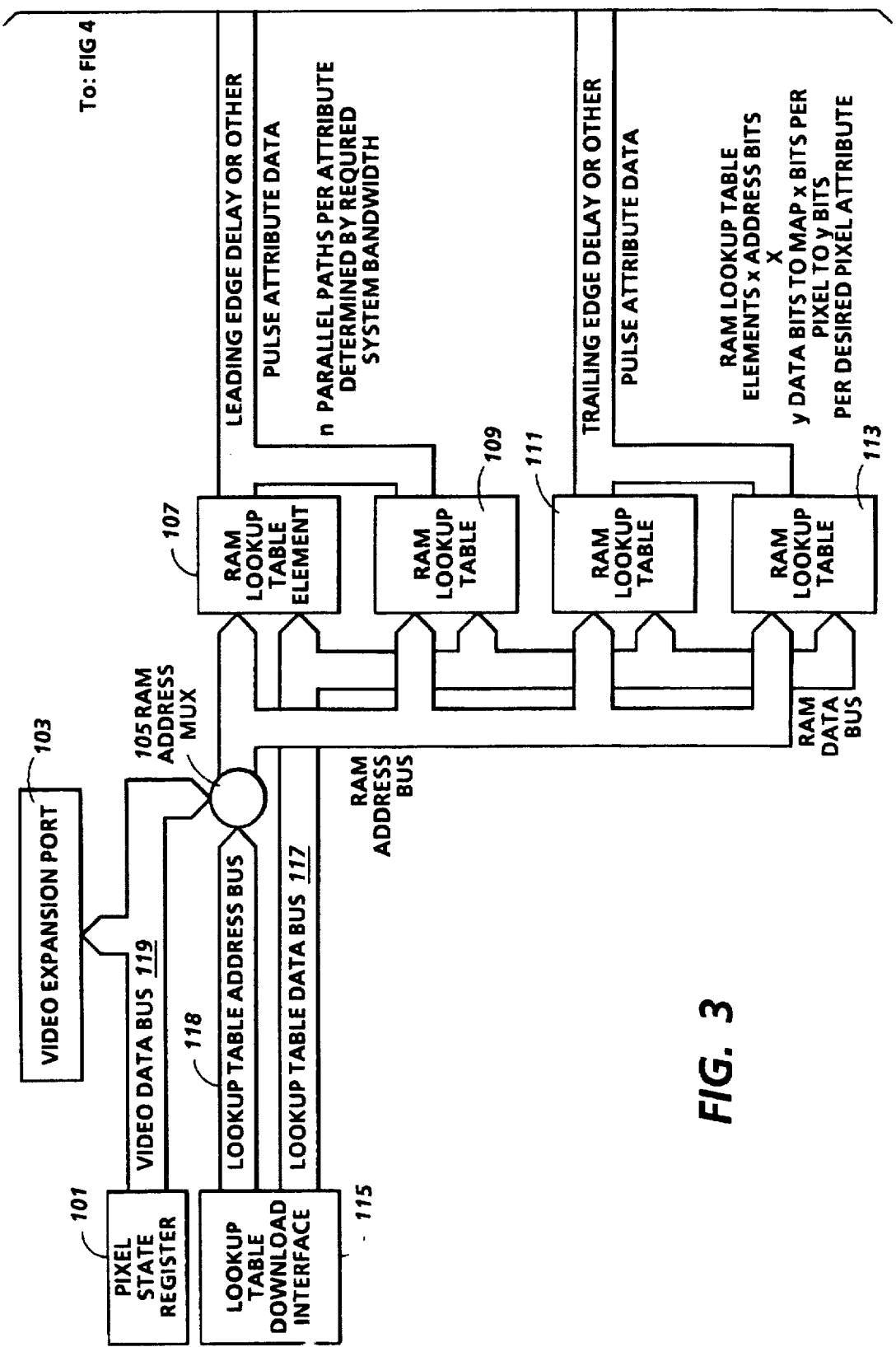
FIGS. 3 and 4 are a schematic block diagram of a pulse modulator according to an embodiment of the present invention.
Figure 4:
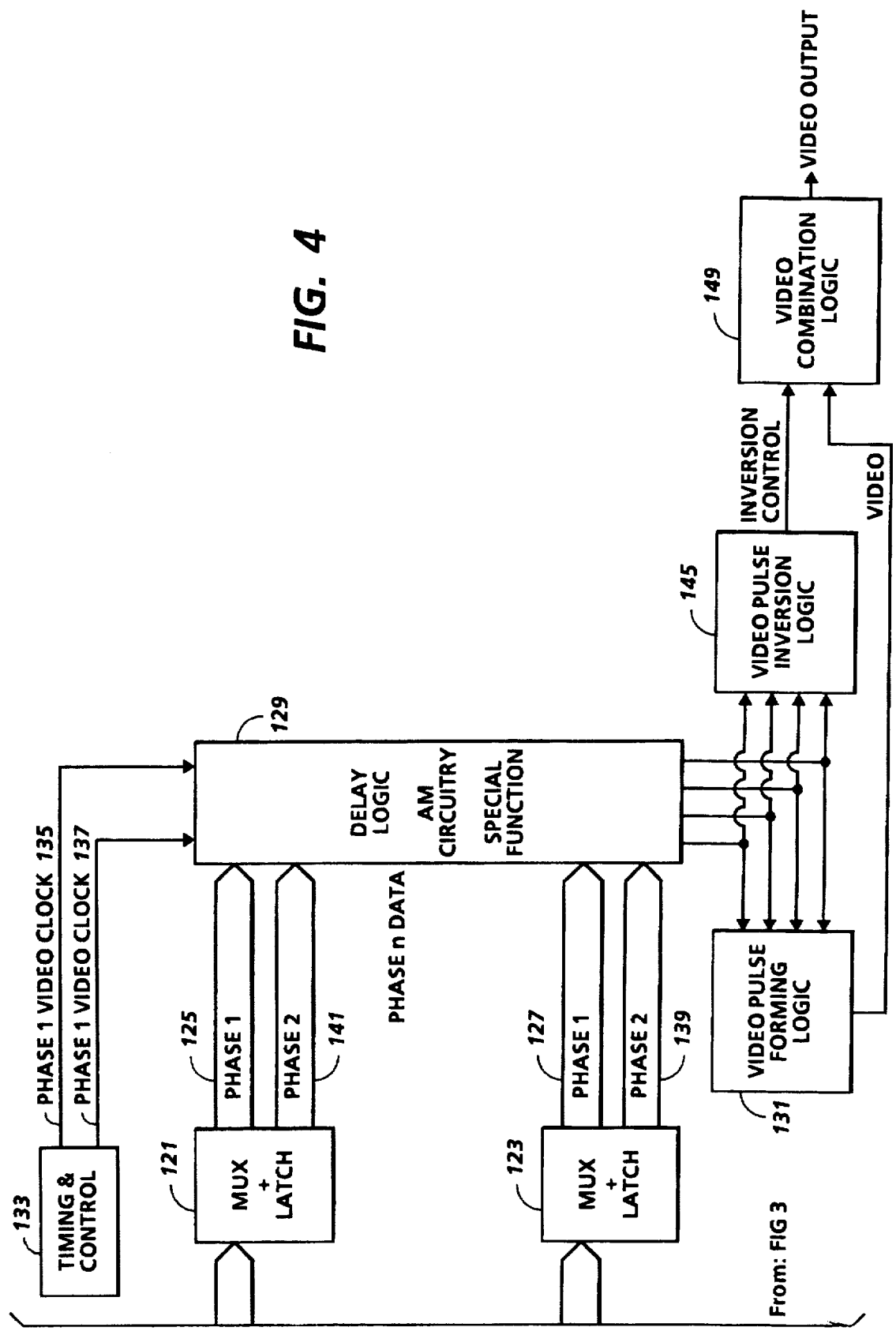

FIG. 2, in conjunction with FIGS. 3 and 4, illustrates the operation of the image resolution enhancement filter represented by block 12 in FIG. 1. Beginning with step 30, the low resolution bitmap image 10 of FIG. 1 is retrieved Next, a target pixel position is identified within the the input bitmap at step 32. The target pixel position representing that pixel that is to be resolution enhanced by the following operations. At step 34, the "on" or "off" states (i.e., a binary input image in the present embodiment) of a set of pixels surrounding or in close proximity to the target pixel are observed through, what is termed "the pixel observation window." In a practical sense, the step of observing the pixel states is equivalent to retrieving the binary signal level for each pixel within the set of pixels. Moreover, the set of pixels is determined as a function of the design of the template-based filter as will be described with respect to FIGS. 6 and 7, and as described in copending application Ser. No. 08/169,483 by Eschbach, filed concurrently herewith, the relevant portions thereof being hereby incorporated by reference for their teachings.

Having observed the pixel states in the observation window about the target pixel, step 34, the states are used to generate an index pointer, for example a series of binary values stored in an address register, step 36. Once generated, the index pointer may then be used to access a location in a memory or look-up table (LUT), step 38. Once a particular location of the LUT is accessed a data value stored therein is placed on a data bus for output to the marking engine as represented by step 40. Having completed the generation of the enhanced output for the target pixel, the process repeats if additional pixels remain in the input image, as determined by step 42. If all pixels within the input image have been resolution enhanced, the process is complete, step 44.

Turning next to FIGS. 3 and 4, an architecture capable of executing the aforedescribed operations of the enhancement filter will now be described. A series of data words, each N bits per pixel where N is 8 in the preferred embodiment, is input into the pulse modulator from pixel state register 101, where the value therein is a function of the pixel states in the observation window associated with the target pixel (step 36 of FIG. 2). The series of data words may be sent through a video expansion port 103 to other pulse modulators (not shown) for parallel processing, such as in the case of color printing where similar processing of the video information is performed for different colors.

The present invention further includes translating means, splitting means, pulse forming means, and generating means. In the pulse modulator of FIGS. 3 and 4, a data word from the series is sent through a RAM address multiplexer 105 to a translating means. As embodied herein, the translating means comprises four random access memory (RAM) look-up tables 107, 109, 111, and 113. Each data word represents an address within the four RAM look-up tables 107, 109, 111, and 113. In a preferred embodiment, a pair of 256×4 ECL RAM look-up tables is used to generate a pulse attribute word for each pulse attribute sought to be controlled.

Pulse attributes may include leading edge delay, trailing edge delay, amplitude of the pulse to be formed, and other special features such as an inverted or multiple pulse per pixel selection. Alternatively, a single 256×8 ECL RAM look-up table may be used to generate each pulse attribute word. The embodiment of FIG. 3 shows two pairs of 256×4 RAM look-up tables 107 and 109, 111 and 113 that correspond to the two pulse attributes of leading edge delay and trailing edge delay. The pulse modulator will accommodate as many pairs of 256×4 RAM look-up tables as there are desired pulse attributes. For example, a third pair of 256×4 RAM look-up tables may be used to control the amplitude of a pulse to be formed. Alternatively, a series of RAM addresses in the look-up tables may be assigned to produce inverted pulses. For example, addresses 64–127 would be decoded so that the pulses produced in response to the data output from those table locations would be inverted. Furthermore, a larger or smaller number of addresses may be used, or allocated, for the production of inverted pulses.

Once an address in each RAM look-up table is accessed by the data word from the pixel state register, each RAM look-up table generates a nibble (4 bits) of information. Thus, each pair of RAM look-up tables generates a pulse attribute word (8 bits) corresponding to the pulse attribute sought to be controlled. While an 8-bit implementation may be preferable, it is not a limitation, and the pulse attribute word may be any number of bits (i.e., 4, 6, 8, 10, 12, etc.).

Characteristic data indicative of the pulse attributes sought to be controlled in a pulse modulator may be downloaded into the RAM look-up tables 107, 109, 111, and 113 from the look-up table download interface 115. Once the look-up table download interface 115 accesses an address of a RAM look-up table, a pulse attribute data nibble may be loaded into the RAM look-up table through the look-up table data bus 117 from the look-up table download interface 115. This allows for different mapping functions in the same pulse modulator for different printing characteristics (i.e., font smoothing, graphics, etc.), and further facilitates maintenance of print quality as the components of the system age. After the RAM look-up tables 107, 109, 111, and 113 are loaded, the look-up table download interface 115 instructs the RAM address multiplexer 105 to receive data from the video data bus 119.

In the embodiment of FIG. 3, the four RAM look-up tables 107, 109, 111, and 113 perform the mapping function represented by steps 38 and 40 of FIG. 2, which translates the incoming data word into two pulse attribute words to control the formation of a pulse. In FIG. 3, the top two RAM look-up tables 107 and 109 generate separate nibbles of pulse attribute information that combine to form a pulse attribute word for the leading edge delay of a pulse to be formed. The bottom two RAM look-up tables 111 and 113 generate separate nibbles of pulse attribute information that combine to form a pulse attribute word for the trailing edge delay of a pulse to be formed.

As illustrated in FIG. 4, each pulse attribute word is fed to a respective splitting means that comprises multiplexer and latch blocks 121 and 123. In the preferred embodiment, each respective multiplexer and latch block contains two latches, one for each of the phase 1 and phase 2 buses. The two pulse attribute words generated in the RAM look-up tables 107, 109, 111, and 113 form data words that are latched onto the phase 1 buses by their respective multiplexers 121 and 123 at a leading edge of a pulse from the phase 1 video clock 135.

The two data words latched on their respective phase 1 buses 125 and 127 are further processed on separate channels in a pulse forming means corresponding to each channel. As depicted, the pulse forming means comprises a delay logic block 129 for forming separate leading and trailing edge delayed pulses and a video pulse forming logic block 131. The video pulse forming logic block 131, which comprises the generating means, forms a single pulse from the leading and trailing edge delay pulses. Subsequent to generation of the first or normal pulse in the video pulse forming logic block 131, the pulse may be inverted under the control of the combination logic block 149.

As represented by the preferred embodiment depicted in FIG. 4, video combination logic block 149 allows the video signal from video pulse forming logic block 131 to pass unaltered if a logic zero is present on the inversion control line. On the other hand, at any time the video pulse inversion logic block 145 should produce a logic one on the inversion control line, the video pulse signal output from block 131 will be inverted so as to form a pair of video pulses.

It is noted that the speed of a typical scanning system, with only a single phase video clock and corresponding phased set of buses, is limited by the speed at which its delay and pulse forming logic 129 and 131 can operate on pulse attribute words and then be reset to accept new pulse attribute words. In the embodiment shown in FIG. 4, with only the phase 1 video clock 135 and phase 1 buses 125 and 127, the delay and pulse forming logic blocks 129 and 131 may limit the processing speed of the pulse modulator. Specifically, while the two pulse attribute words corresponding to the first data word are being processed by the delay and pulse forming logic blocks 129 and 131, a second pair of pulse attribute words corresponding to a second data word will already be formed, waiting at the respective multiplexer and latch blocks 121 and 123 to be latched onto the phase 1 buses 125 and 127 and processed by the delay and pulse forming logic 129 and 131.

Figure 5:
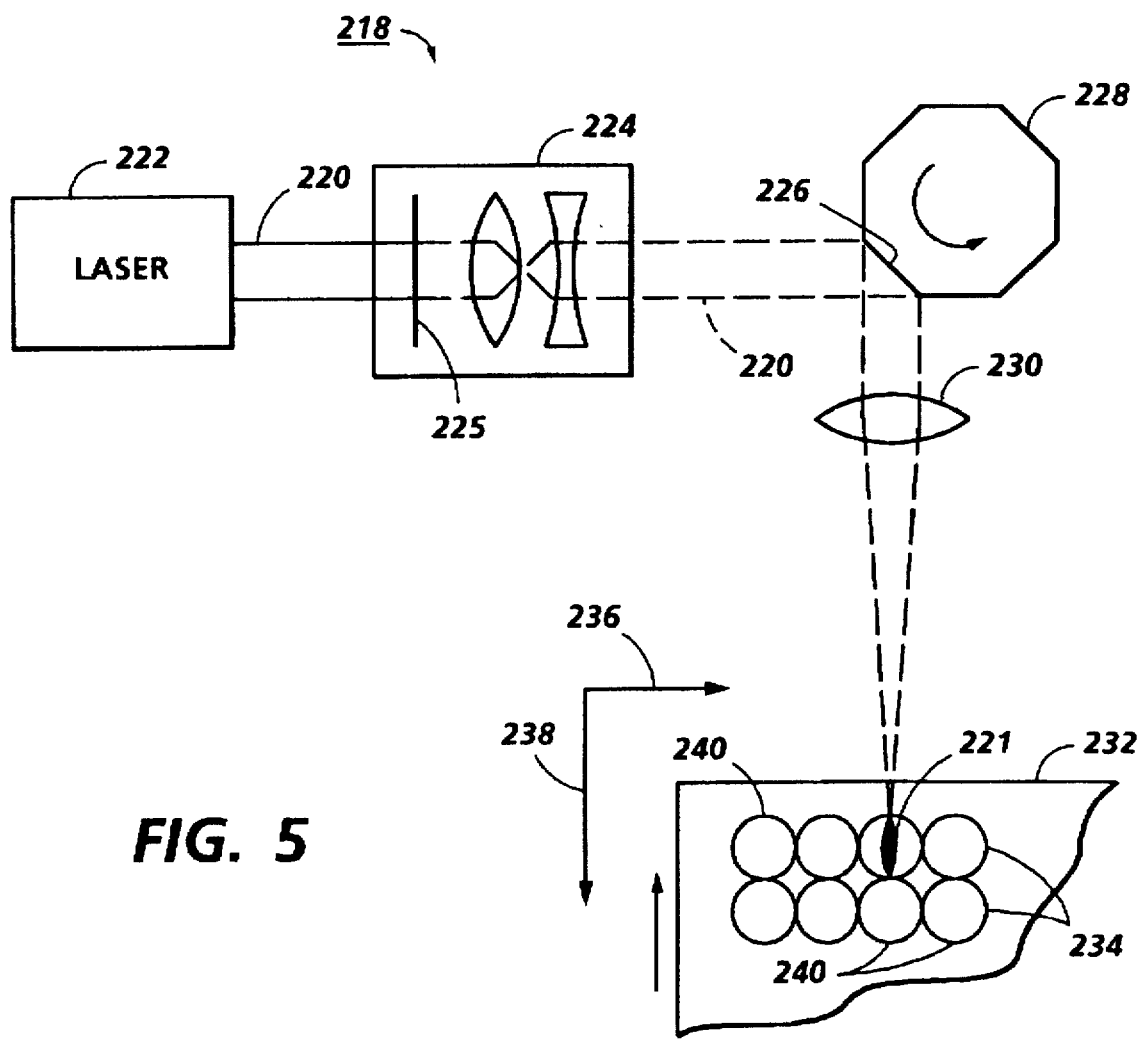
FIG. 5 is a schematic illustration of a Raster Output Scanner (ROS), illustrating a portion of the photosensitive image plane.

Referring now to FIG. 5, upon receiving the video output from combination logic block 149 of FIG. 4, a marking engine in the form of a raster output scanner (ROS) 218 may be used to print the video signals of the enhanced bitmap. There are two common types of ROS 218, flying spot and pulsed imaging. In both, a laser beam 220, emitted from laser 222, passes into conditioning optics 224 that may include a modulator 225. For precise periods of time, determined in response to video signals supplied to ROS 218, modulator 225 either blocks or deflects the laser beam, or allows the beam to pass through the conditioning optics to illuminate a facet 226 of rotating polygon 228. Laser 222 may be a helium-neon laser or a laser diode. In the latter case, the video data could directly modulate the laser rather than modulator 225. In addition, more than a single laser source 222 or beam 220 could be employed to practice the invention.

After reflecting off facet 226, laser beam 220 passes through conditioning optics 230 and forms a spot 221 on photosensitive image plane 232. The rotating facet causes laser spot 221 to scan across the image plane in a line 234. Line 234 lies in what is commonly referred to as the fast scan direction, represented by arrow 236. In addition, as facet 226 rotates, image plane 232 moves in a slow scan direction, substantially perpendicular to the fast scan direction, as represented by arrow 238. Movement in the slow scan direction is such that successive rotating facets of the polygon for successive scan lines 234 that are offset from each other in the slow scan direction. Subsequent to exposure the latent electrostatic image remaining on photosensitive image plane 232 is developed using any commonly known charge sensitive development techniques so as to produce a developed image that is transferable to an output medium.

Each scan line 234 consists of a row of pixels 240, wherein the pixels are produced by the modulation of the laser beam as laser spot 221 scans across the image plane. As beam 220 scans across the scan line, laser spot 221 either illuminates or does not illuminate the individual pixel, in accordance with the video signals provided to ROS. In general, the video signals may be characterized as a serial stream of pulses, where a logic one or a pulse specifies that the beam is to illuminate the surface, while a logic zero, no pulse, will result in no illumination.

For both types of ROS, the width of pixel 240 is dependent upon the period or duration of the corresponding logic one pulse in the video signal supplied to ROS 218. In a scanning spot ROS, at the leading edge of a pulse modulator 225 allows the passage of laser beam 220 onto the image plane. For the duration of the pulse, an oval shaped laser spot 221 is scanned across image plane 232, illuminating at least one addressed pixel 240 within the scan line 234. The width of the illuminated region in the fast scan direction thus depends on the duration of the video pulse, as well as on the width and scanning rate of laser spot 221. Typically, the dimensions of the laser spot are such that it is two to three times wider in the slow scan direction than its width in the fast scan direction. As an example, in a 600 spot per inch, 135 page per minute, dual beam printer, the laser spot at half the maximum intensity is approximately 43 μm wide in the slow scan direction and 20 μm wide in the fast scan direction, and the time period required for the spot to scan across the width of a single pixel 240 is about 15 nanoseconds.

Typically, the video data used to drive the ROS is clocked so that the period within which each pixel is exposed, referred to hereafter as a pixel clock period, is the same. In addition, the video data used to generate the video signal pulses that drive the modulator are also synchronized with ROS 218 and the movement of the image plane 232 in the slow scan direction, thereby allowing a particular bit of video data to address an appropriate portion of image plane 232. The synchronization of the video data, the video signal pulses produced therefrom, the ROS and the image plane is achieved through the use of a system clock that is equivalent to the rate at which pixels must be exposed on the image plane. While faster clocks may allow greater resolution within the video pulse stream, a higher frequency also results in increased costs for faster hardware within the video processing path.

In the present embodiment, a pulse-width, position, and amplitude modulator (pulse modulator) is utilized to form the video signal pulses in response to video data representing the image to be printed. It is noted that while the following description is directed toward a single color output, this is for simplicity of description only and there is no intent to limit the application of the present invention in such a manner.

Figure 6:
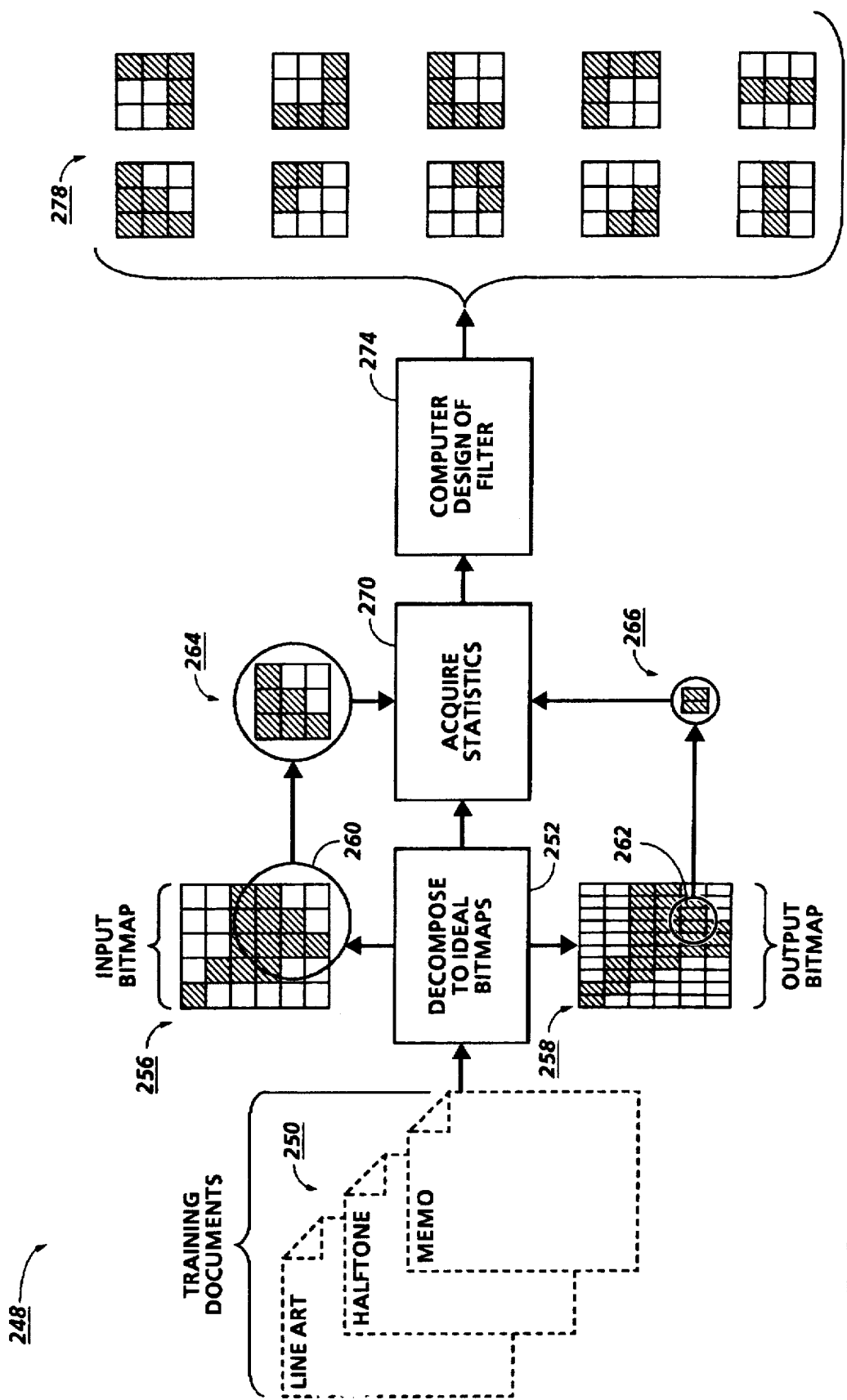
FIGS. 6 and 7 are block diagrams illustrating the various stages in the process used to design the resolution enhancement filters employed by the present invention.
Figure 7:
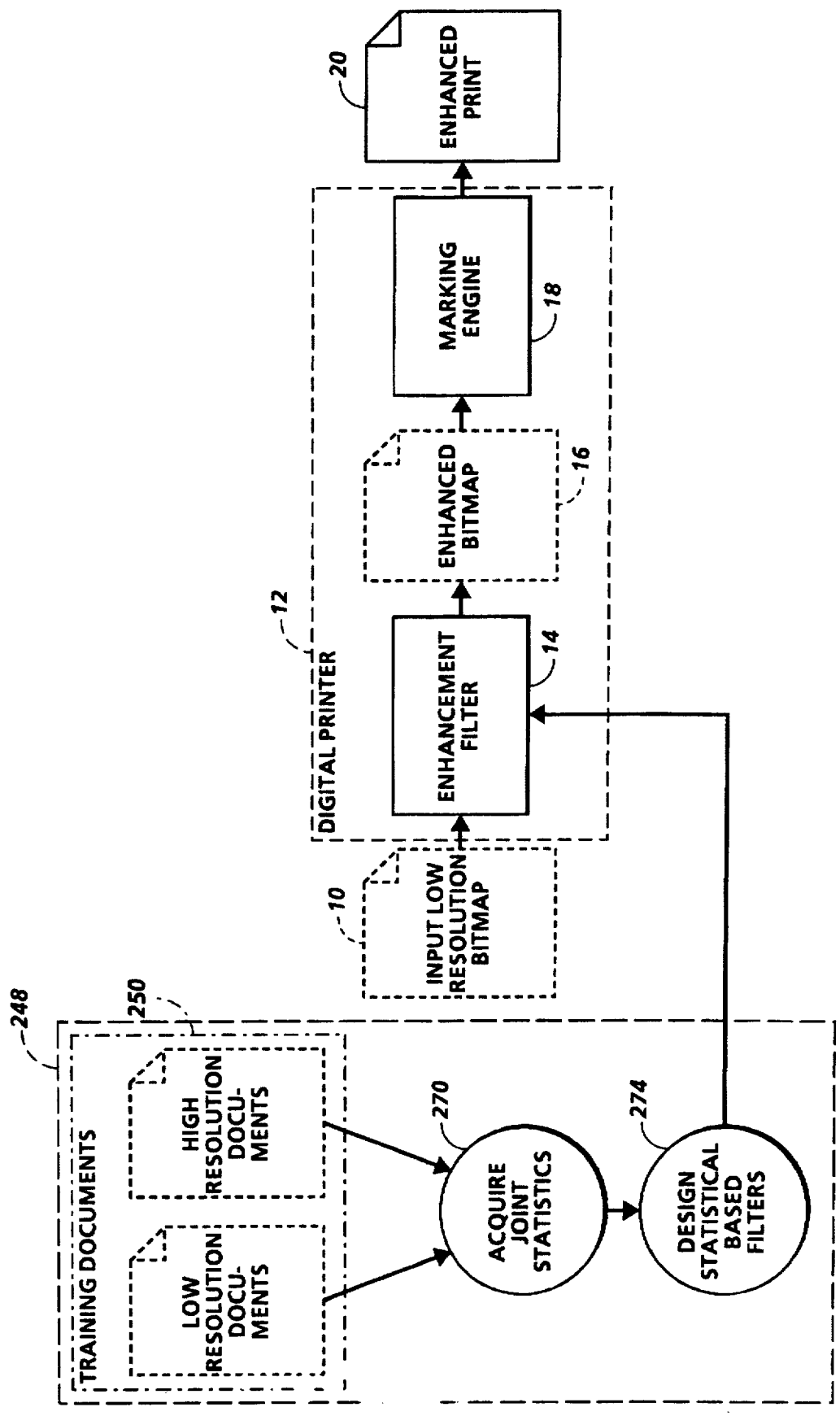
Figure 8D:
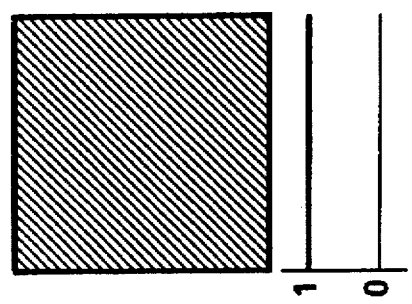
FIGS. 8A–8D and 9A–9H are illustrative examples of the possible pixel states within a resolution enhanced bitmap produced by the present invention.
Figure 8C:
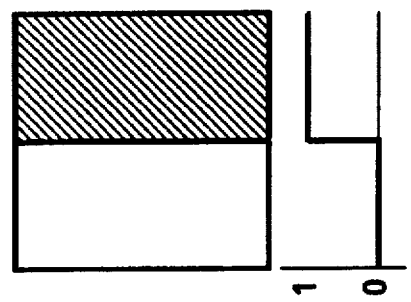
Figure 8B:
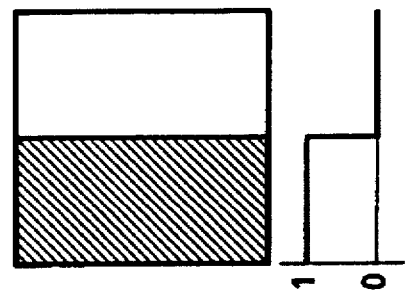
Figure 8A:
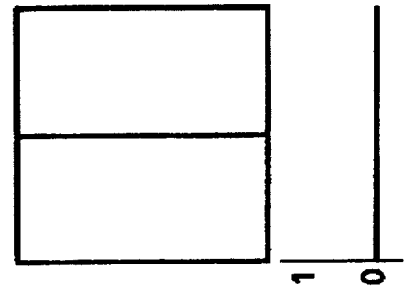
Figure 9D:
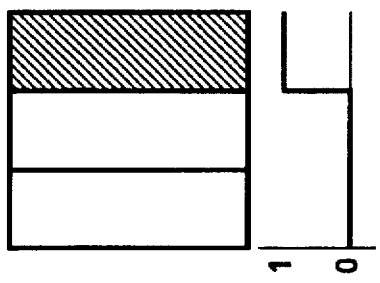
Figure 9C:
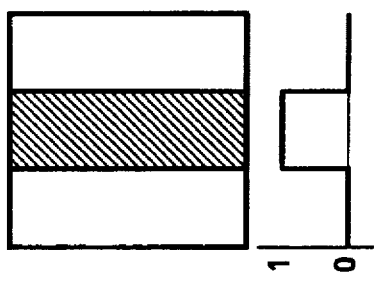
Figure 9B:
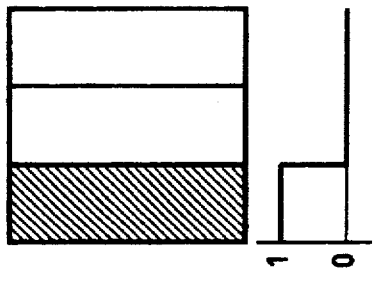
Figure 9A:
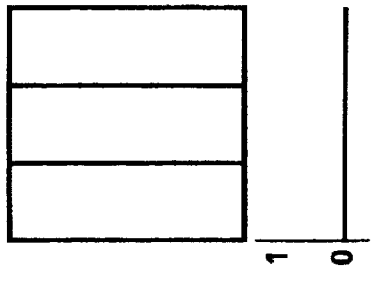
Figure 9H:
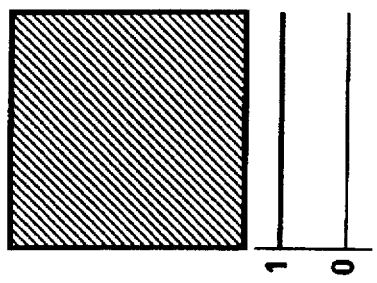
Figure 9G:
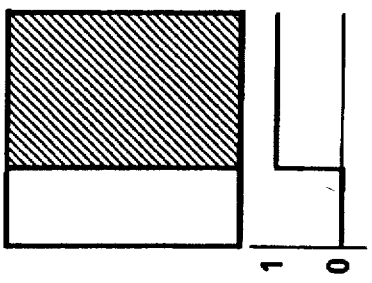
Figure 9F:
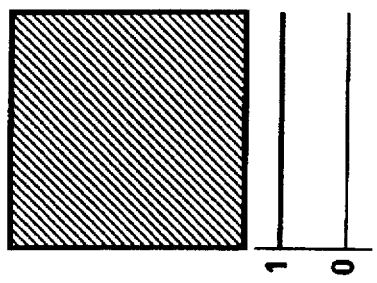
Figure 9E:
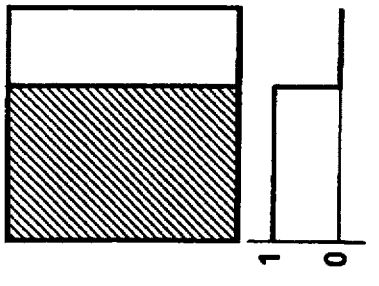

Having described in detail a preferred hardware embodiment for the present invention, attention is now turned to a preferred embodiment for the process used to design the resolution enhancement filters employed in the hardware embodiment. More specifically, FIGS. 6 and 7 are block diagrams illustrating the various stages in the resolution enhancement filter design process 248. As the enhancement filter is implemented as a set of look-up tables, the information stored in the individual look-up table memory locations is determined using a form of the statistical conditional expectation, which is obtained from a training set of bitmaps. For further background on the conditional expectation and how it is used in a similar image processing setting, see *Optimal mean-absolute-error hit-or-miss filters: morphological representation and estimation of the binary conditional expectation*, SPIE Journal of Optical Engineering, vol. 32, no. 4 April 1993, pp. 815–27, the relevant portions of which are hereby incorporated by reference. As FIG. 6 illustrates, and as described in a patent application for a "Method for Statistical Generation of Density Preserving Templates for Print Enhancement," by Loce et al Ser. No. 08/169,565 (U.S. Pat. No. 5,359,423), previously incorporated by reference, a set of training documents are initially chosen as being representative of printed matter that will typically be printed by the printer and digitized into images 250. Subsequently, the images are decomposed at block 252 into a pair of bitmaps 256 and 258. Input bitmap 256 represents the image at the original bit resolution (1), whereas output bitmap 258 represents the image at the printer's bit resolution (N), where the present invention will produce a 1-to-N resolution enhancement. More specifically, the resolution of output bitmap 258 is an anamorphic output resolution that is dependent upon the number of bits-per-pixel that are to be used to produce the output bitmap. For example, the slow scan resolution may be the same in the two bitmaps while the fast scan resolution is a multiple of the input resolution, where the multiplier is the number of bits-per-pixel to be used by the printer in creating the enhanced output.

Figure 10:
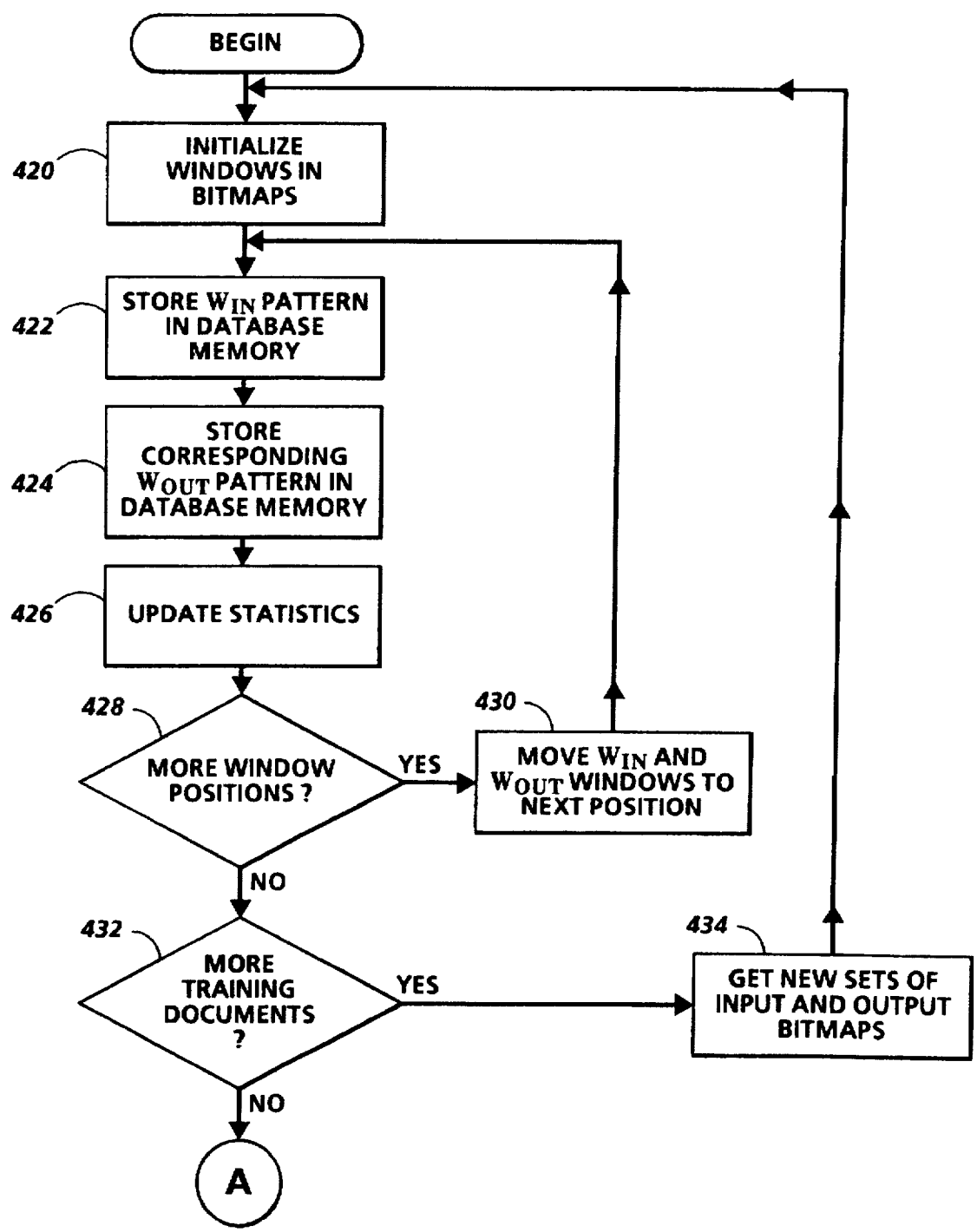
FIG. 10 is a flowchart detailing a portion of the process used to acquire statistics on the decomposed bitmaps in accordance with the embodiment depicted in FIG. 6.

The operation of acquire statistics block 270 is further illustrated in FIG. 10, which is a flowchart depicting the processing steps accomplished by the block. Initially, template and pattern windows are established within both the first and second resolution bitmaps, respectively, step 420. As illustrated by extracted pixels 264 and 266, respectively, the input bitmap window, or template window, 264, encloses a plurality of input pixels surrounding an input pixel position, while the output pattern window 266, encloses a series of output pixel positions.

Returning to FIG. 3, once the template window 264 and pattern window 266 have been established, the pattern of pixels within both windows (e.g., the template representing the binary states of the pixels in a window) are associated with one another and an entry representing the pixel patterns occurring in the input template window is stored in a database, as represented by steps 422 and 424, assuming that an identical pattern has not been previously detected. Subsequently, occurrence fields associated with each of the output pattern positions are incremented from an initial zero value if the corresponding pixel within the output pattern window 266 is a black or active pixel.

The purpose of the occurrence fields is to keep track of the number of times that certain pixel positions produce black pixels for a given input template pattern. In subsequent iterations, whenever an identical input pattern is already present in the database, occurrence fields associated with the database entry for the input pattern are incremented, step 426, to indicate the occurrence of black pixels within the output pattern window. Thus, the relative frequency of occurrence of black and white pixel states is known, or can be calculated, from the stored occurrence field information. Use of the data base in this manner enables the collection of statistical information with respect to the individual pixels most frequently produced in response to a given pattern of pixels in the input template.

Once an input template entry has been created, step 428 executes a test to determine if there remain further pixel positions within the first and second resolution bitmaps that have not been processed. If so, step 430 causes the position of windows 264 and 266 to be advanced to corresponding locations in their respective bitmaps.

Similarly, step 432 determines if the database being compiled is complete by testing whether the bitmaps generated from all the training documents have been exhausted. If not, the previously described process is repeated for any remaining input and output bitmap pairs. Otherwise, the generation of the template database entries and compilation of statistics as represented by block 270 is complete.

To further illustrate this process, consider the following. In designing a look-up table resolution enhancement filter for enhancing a 300×300 spot per inch (spi), 1 bit/pixel bitmap [300×300×1] to produce a 300×300 spi, 2 bit/pixel bitmap [300×300×2], the training set of document images would be decomposed to a 300×300×1 input image and a 300×600×1 output image. This would allow two pixels in the fast-scan direction to be grouped to generate a pulse-width, pulse-modulated (PWPM) video output signal that can be used in the training procedure. Illustrated in FIGS. 8A–8D are the possible 300×600 output patterns that could be used to produce the desired output training signals. Specifically, FIGS. 8A through 8D respectively represent PWPM codes 0 through 3, and the pulse pattern used to produce the desired output is included along the bottom of each figure.

Similarly, a 1-to-3 resolution enhancement would result in the possible output patterns illustrated in FIGS. 9A through 9H for respective PWPM codes 0 through 7. Notable in this set of possible codes is the pulse train associated with PWPM code 5 (FIG. 9F), where the pulse train would be inverted (represented by the dashed line for the video pulses) to produce a pair of edge justified pulses as shown in the associated output pattern. As previously described, the pulse attribute word would be employed to fully characterize the pulse pattern of the output in accordance with the pulse codes depicted in the examples in FIGS. 8A–8D and 9A–9H.

After decomposing the training documents to obtain representative input and output bitmaps, individual co-located windowed sections thereof are viewed, represented by regions 260 and 262 so as to produce extracted windowed pixels of the images, 264 and 268, respectively. These extracted portions are then analyzed by block 270 so that statistics may be acquired. The statistics are primarily intended to record the number of times a given output pattern (e.g. PWPM code) occurs co-located at a target pixel for a particular pattern of pixels within the extracted window of pixels from the input image. A 3×3 input window region is illustrated in FIG. 6, however, there is no intent to limit the present invention to that particular size.

Figure 11:
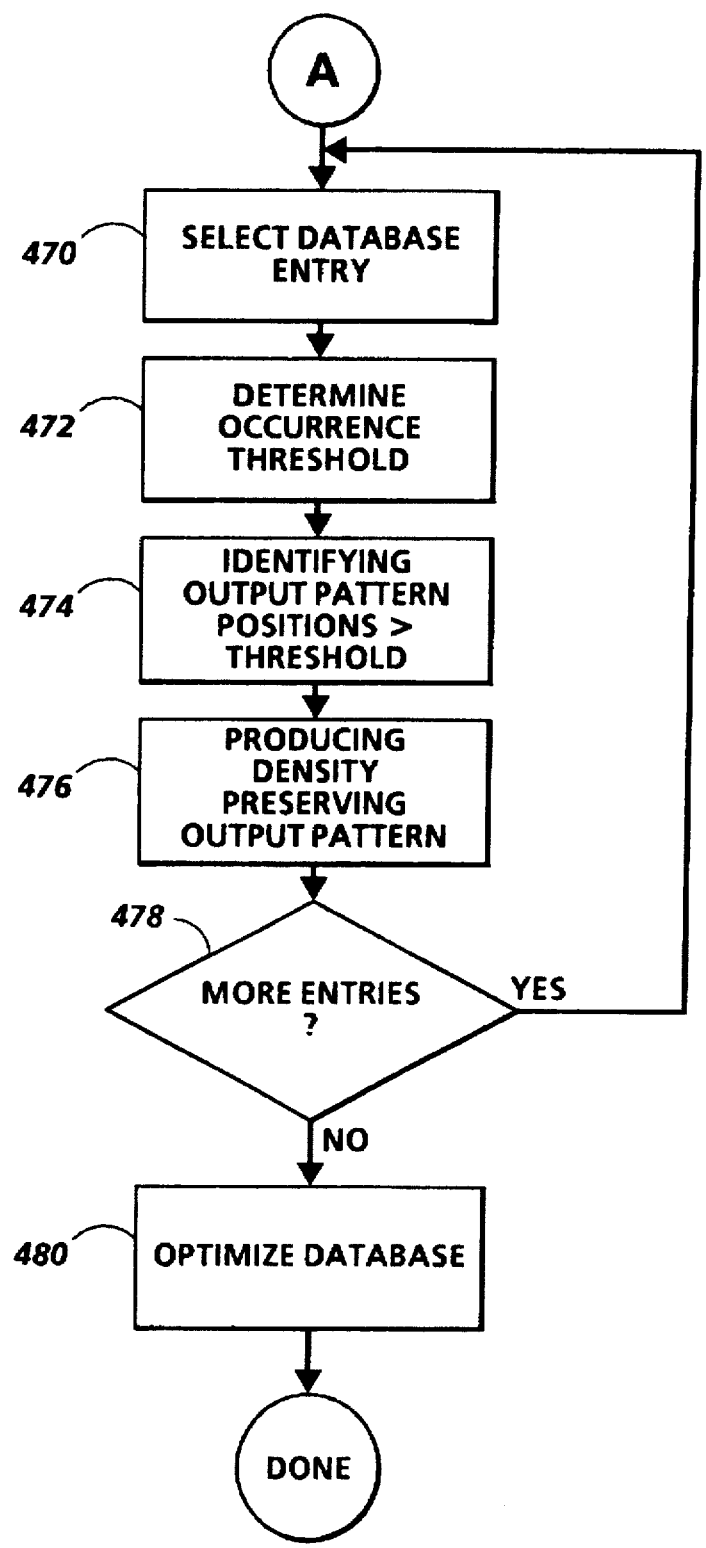
FIG. 11 is a flowchart illustrating various aspects of the process used to automatically design the enhancement filter in accordance with the present invention.

Once the statistics are acquired at block 270, the information is passed to filter design block 274 where the information is analyzed to find the most frequently occurring output pattern (pulse attribute word represented by a PWPM code) for each possible arrangement of input pixels. The most frequently occurring code is then selected to be stored in the look-up table at the address location corresponding to the input pixel binary pattern, as represented by patterns 278. In statistical terms, for a given input pattern there will be a distribution of output codes that were obtained during the training process. The most frequently occurring output code, which is the mode of this distribution, is chosen as the filter output for the given input pattern. As shown in FIG. 7, design process 248 produces a set of statistically designed enhancement filters, which are applied by the digital printer 12. As illustrated in the flowchart of FIG. 11, which further describes the details of the filter design operations (FIG. 6, block 274), for each unique input template pattern entry in the database the occurrence information is analyzed. Specifically, at step 470 a database entry is selected for analysis. Next, an occurrence threshold is determined for the entry as a function of the number of occurrences of the input template pattern. To design a filter that achieves the same input/output density relationship as the training set, the threshold is chosen to be one-half of the number of occurrences of the input template (step 472). Other functions of the number of occurrences can be used for the threshold if a density change is desired. At step 474, the threshold is applied to the output pixel field and those output pixels that have occurred in an activated state more times than the threshold are chosen to be activated in the output pattern, and conversely for the pixels that have been activated fewer or equal times to the threshold. Subsequently, at step 476, the identified output pixel positions are used to produce the density preserving output pattern. In other words, a template pattern pair similar to that depicted in windows 264 and 266 is produced so that the statistically preferred pattern of output pixels will be generated whenever the input template pattern for that entry is detected in an image that has been input to an image rendering device that possess the filter. The above process is then repeated for each entry in the database, as represented by test step 478 to generate a filter, or look-up table, of input templates and output patterns that may be used in a digital image rendering device. As an additional step 480, the database may be optimized so as to reduce its size to one that is implementable within a look-up table of a preferred maximum size and cost.

In recapitulation, the present invention is a method and apparatus for improving the appearance of printed documents, and more specifically, to the use of a template matching process to enhance the fast-scan resolution of digital images while maintaining raster resolution for printing. The present invention uses multiple-bit per pixel, statistically generated templates implemented using look-up tables to improve document appearance by converting from a single-bit per pixel to N-bits per pixel while preserving raster resolution of the printed output. The resulting N-bit per pixel image signals may be utilized to control a scanning beam where the beam varies in intensity and duration according to the pulses used to control it.

It is, therefore, apparent that there has been provided, in accordance with the present invention, a method and apparatus for improving the appearance of printed documents. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for enhancing a printed output produced by an electronic reprographic system capable of printing a bitmap image by producing a series of pulse-width, position-modulated signals, comprising the steps of:

predetermining a set of possible pulse attribute words to define the characteristics of corresponding pulse-width, position-modulated signals, the set of possible pulse attribute words representing statistically significant arrangements of input pixels within a pixel observation window;

programming a look-up table memory using the set of possible pulse attribute words;

selecting a target pixel location in the bitmap image;

observing a set of pixels within a pixel observation window superimposed on the bitmap image, relative to the target pixel location;

generating an index pointer as a function of a subset of the set of pixels; and using the index pointer to access the look-up table memory, looking-up the pulse attribute word that defines the characteristics of the pulse-width, position modulated signal that will be used to print the target pixel so as to enhance the resulting printed output.

2. The method of claim 1, further comprising the step of repeating each step for every pixel within the bitmap image.

3. The method of claim 1, wherein said step of observing a set of pixels within a pixel observation window, comprises:

retrieving the binary signal level for each pixel of the bitmap image located within the pixel observation window; and determining the binary states of the subset of pixels, wherein the subset of pixels is defined as a function of a predetermined template-based filter design.

4. The method of claim 3, wherein said step of generating an index pointer, comprises storing the binary signal level retrieved for each pixel in a predetermined bit position within an address register.

5. The method of claim 4, wherein said step of looking-up a pulse attribute word that defines the characteristics of the pulse-width, position modulated signal, comprises:

applying the index pointer stored in the address register to an address bus so as to access a memory location corresponding to the index pointer; and supplying the data value stored in the memory location to a pulse-width, position modulated marking engine so as to enhance the printed output.

6. The method of claim 5, further comprising the step of repeating each step for every pixel within the bitmap image.

7. A method for enhancing a printed output produced by an electronic reprographic system capable of printing a bitmap image by producing a series of pulse-width, position-modulated signals, including the steps of:

selecting a target pixel location in the bitmap image;

observing a set of pixels within a pixel observation window superimposed on the bitmap image, relative to the target pixel location;

generating an index pointer as a function of a subset of the set of pixels; and using the index pointer, looking-up a pulse attribute word that defines the characteristics of the pulse-width, position modulated signal that will be used to print the target pixel so as to enhance the resulting printed output, wherein the pulse attribute word that defines the characteristics of the pulse-width, position modulated signal is determined by choosing a set of training documents, wherein the training documents are generally representative of printed matter produced by the reprographic system, digitizing the training documents to produce training images, decomposing the training images into an input training bitmap, representing the training image at the original bit resolution, and an output training bitmap, representing the training image at the bit resolution of the electronic reprographic system, repeatedly extracting corresponding windowed sections of the input and output training bitmaps, analyzing the extracted windowed sections of the input and output training bitmaps so as to acquire statistics about relationships therebetween, and determining the pulse attribute word for each possible arrangement of input training pixels within the window, wherein an appropriate pulse attribute word will be generated in response to an index pointer that represents a unique arrangement of input training pixels.

8. The method of claim 7, wherein the step of analyzing the extracted windowed sections of the input and output training bitmaps determines the distribution of relationships therebetween and further comprises the step of determining the appropriate pulse attribute word that defines the characteristics of the pulse-width, position modulated signal using a statistical mode for relationships obtained from the training bitmaps.

9. The method of claim 7, wherein the step of analyzing the extracted windowed sections of the input and output training bitmaps, comprises recording, in a second memory, the number of occurrences of a given output training bitmap pattern for a particular pattern of pixels within an extracted window of pixels from the input training bitmap.

10. The method of claim 9, wherein the step of determining the pulse attribute word, comprises:

finding the most frequently occurring output training bitmap pattern for each possible arrangement of input training bitmap pixels; and assigning the pulse attribute word required to produce the most frequently occurring output training bitmap pattern to a look-up table memory.

11. An electronic printing apparatus capable of printing a bitmap image by producing a series of pulse-width, position-modulated signals, comprising:

pixel selection means for selecting a target pixel location in the bitmap image;

image memory for recording the binary states of a set of pixels in the bitmap image located within a pixel observation window positioned relative to the target pixel location;

a pixel state register for storing an address generated as a function of the binary states of a subset of the pixels stored in said image memory; and translating means, responsive to the value stored in said pixel state register, for outputting a pulse attribute word that defines the characteristics of the pulse-width, position modulated signal used to print the target pixel so as to enhance the resulting printed output, said translating means being a preprogrammed memory device, wherein the pulse attribute word is predetermined by selecting from a set of possible pulse attribute words the subset of pulse attribute words that represent statistically significant arrangements of input pixels within the pixel observation window.

12. The apparatus of claim 11, wherein said translating means, comprises:

a look-up table formed from a plurality of contiguous memory locations;

an address bus suitable for selecting, as a function of the address presented thereon, a location within said look-up table; and a data bus, connected to said look-up table, to enable a value stored within the addressed location of said look-up table to be output to control the generation of the pulse-width, position modulated signal used to print the target pixel.

13. An electronic printing apparatus capable of printing a bitmap image by producing a series of pulse-width, position-modulated signals, comprising:

pixel selection means for selecting a target pixel location in the bitmap image;

image memory for recording the binary states of a set of pixels in the bitmap image located within a pixel observation window positioned relative to the target pixel location;

a pixel state register for storing an address generated as a function of the binary states of a subset of the pixels stored in said image memory; and translating means, responsive to the value stored in said pixel state register, for outputting a pulse attribute word that defines the characteristics of the pulse-width, position modulated signal used to print the target pixel so as to enhance the resulting printed output, wherein the pulse attribute word output by said translating means includes information for controlling the formation of a corresponding pulse during a clock period, and where the apparatus further comprises means for splitting the series of pulse attribute words into two channels, means corresponding to each channel for accepting pulse attribute words from respective channels, and forming pulses using the information included in the pulse attribute words for controlling the formation of the pulses, means for generating the pulses, wherein a pulse from a first pulse forming means is generated while a pulse from a second pulse forming means is being formed, and a pulse inverter for selectively inverting a pulse generated during a clock period to produce a pair of complimentary pulses within the selected period.

14. The apparatus of claim 13, wherein said translating means includes means for translating the value stored in said pixel state register into a first and a second series of pulse attribute words, the first series of pulse attribute words corresponding to formation of a leading edge of each pulse, and the second series of pulse attribute words corresponding to formation of a trailing edge of each pulse.

15. The apparatus of claim 14, wherein each pulse attribute word corresponding to formation of a leading edge of a pulse contains information for a delay, measured from the beginning of a pixel period to the leading edge of the pulse, and each pulse attribute word corresponding to the formation of a trailing edge of a pulse contains information for a delay, measured from the beginning of a pixel period to the trailing edge of the pulse, and wherein the information for the delay to the leading edge of the pulse and the information for the delay to the trailing edge of the pulse are independently variable.

16. The apparatus of claim 15, wherein each pulse attribute word contains information for use by said pulse inverter so as to enable the selective inversion of a pulse produced in response to an attribute word.

17. An electronic printing machine, comprising:

a raster exposure device; and an enhancement filter, connected to said raster exposure device, for performing 1-to-N bit per pixel resolution enhancement on a bitmap image input thereto so as to produce a series of pulse-width, position-modulated signals to drive said raster exposure device, said enhancement filter including pixel selection means for selecting a target pixel location in the bitmap image;

image memory for recording the binary states of a set of pixels in the bitmap image located within a pixel observation window positioned relative to the target pixel location;

a pixel state register for storing an address generated as a function of the binary states of a subset of the pixels stored in said image memory; and translating means, responsive to the value stored in said pixel state register, for outputting a pulse attribute word that defines the characteristics of the pulse-width, position modulated signal used to print the target pixel so as to enhance the resulting printed output, said translating means being a preprogrammed memory device, wherein the pulse attribute word is predetermined by selecting from a set of possible pulse attribute words the subset of pulse attribute words that represent statistically significant arrangements of input pixels within the pixel observation window.

* * * * *